July 10, 1923.

F. THORNTON

RESILIENT RIM FOR AUTOMOBILE WHEELS

Filed Nov. 3, 1922

1,461,505

FREDERICK THORNTON
INVENTOR.

BY
Rollin W. Holbrook
ATTORNEY.

Patented July 10, 1923.

1,461,505

UNITED STATES PATENT OFFICE.

FREDERICK THORNTON, OF HUNTINGTON, WEST VIRGINIA.

RESILIENT RIM FOR AUTOMOBILE WHEELS.

Application filed November 3, 1922. Serial No. 598,814.

*To all whom it may concern:*

Be it known that I, FREDERICK THORNTON, a citizen of the United States, residing at Huntington, in the county of Cabell and State of West Virginia, have invented certain new and useful Improvements in Resilient Rims for Automobile Wheels, of which the following is a specification.

My invention relates to that type of vehicle wheel which dispenses with the pneumatic tire and provides a resiliently supported rim upon which a solid rubber tire may be placed.

Among other objects of this invention, I propose to provide a rim structure which may be inserted upon, and held in place on, the periphery of a conventional motor vehicle wheel.

This structure embodies an inner solid circular rim between which and the tire are peculiarly and efficiently arranged a number of resilient elements or spring members which render the use of a solid rubber tire as advantageous as the use of a pneumatic tire.

Another object of the invention is to so arrange the spring members that they may be compressed throughout the periphery of the rim structure and after such compression the tire may be inserted in position.

Thereafter, the spring members are allowed to expand so that they may hold the tire in place and give it the desired resiliency.

Another object of my invention is to provide the spring members with adjusting devices so that the resiliency of the tire may be controlled as desired.

A still further object of my invention is to provide adjusting devices for the spring members so that said devices may be used to present a new surface of the tire for use after a large portion of the tire is worn away.

Referring to the annexed drawing.

Figure 1:
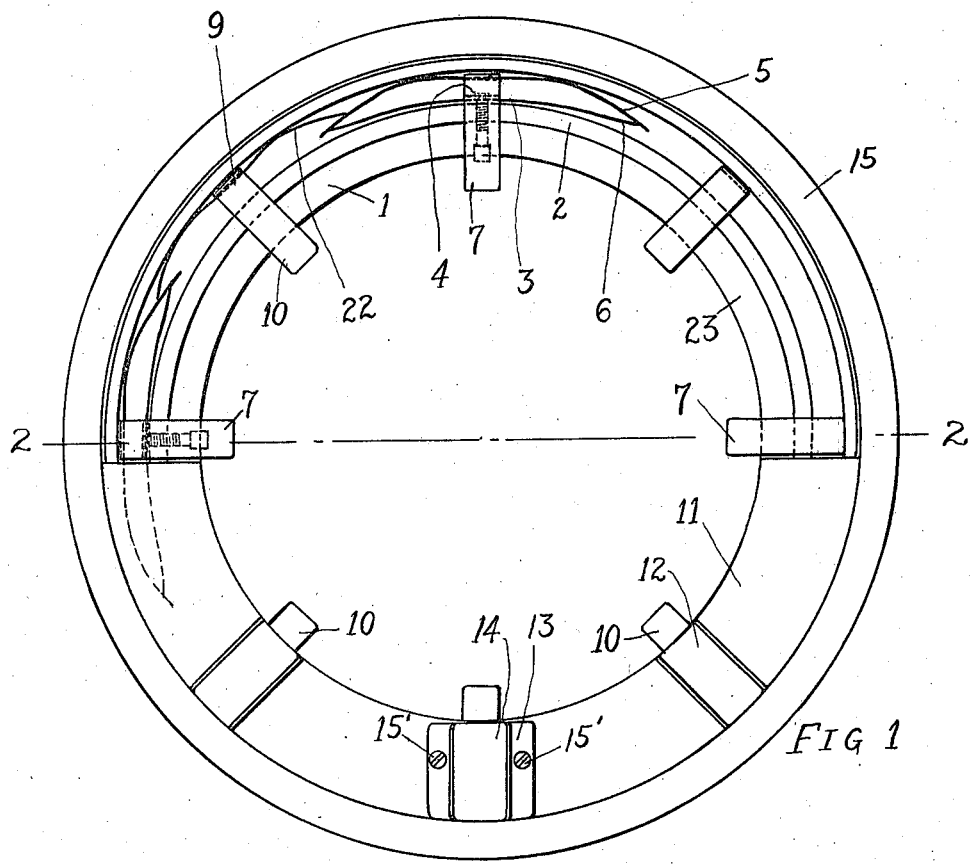
Figure 1 is a view of my invention partly in side elevation with all of the parts in position and partly in a similar elevation with some members removed.
Figure 2:
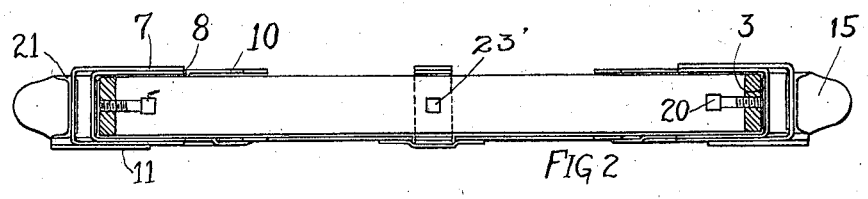
Figure 2 is a sectional view taken on the line 2—2 of Figure 1.

My invention embodies a device adapted to be placed in position on the rim of a wheel such as is represented by the numeral 1.

Arranged to contact with said rim is a solid circular element 2. Passing through the element 2 at regularly spaced points therein and screw-threaded through said rim are set-screws 20.

Radial holes are, of course, bored through rim 1 to allow the insertion of said set-screws and other access thereto.

These set-screws contact with spring members 3 at their outer ends and are effective to vary the force exerted by said spring members and cause the tire 15 to be more or less resilient as desired.

The spring members 3 extend in a direction outwardly from the set-screws and directly outside of the element 2, having their outer ends curved upwardly so as to contact with spring members 5, which are secured at their mid-points to U-shaped members 7. The upwardly curved ends of the spring members 3 are represented by the numeral 6. It is to be noted that the ends of the spring members 3 have sliding contact with relation to the under surfaces of the spring members 5 and that the former are capable of sliding a considerable distance along said surfaces of the latter members.

The U-shaped member 7 has its arms extending inwardly toward the center of the rim structure and located adjacent to the felly 1 of the vehicle wheel so as to hold the spring in correct position relative to the wheel.

Similar U-shaped members are secured to alternate ones of the inner spring members 3 and have their parallel arms lying between the arm 7 and the wheel.

These members 7 and 8 slide back and forth radially as the rim structure is used.

Alternating around the rim structure with such pairs of spring members as are above described are similar spring members 22, having U-shaped guiding members 10 secured thereto at 9. The ends of these latter spring members 22 overlie the ends of the spring members 5.

Secured to the element 1 on one side thereof may be circular ring which is integral throughout and of a width corresponding to the width of the arcuate flange 11, which is shown in Figure 1.

Secured to the other side of the element 1 and having their ends closely adjacent to the side edges of the arms 7, are a plurality of arcuate plates 11, which have grooves 12 formed at their midsections and extending radially so as to allow the member 10 to slide inwardly and outwardly between the edge of the element 1 and the surface of said arcuate plate.

At the points on the rim structure where there are two sliding members such as represented by 7 and 8, there are detachably bolted to the ends of the members 11 guide members which are U-shaped in cross-section so as to confine the members 7 and 8 in correct position and allow them to slide inwardly and outwardly. These U-shaped members are represented by the numerals 13 and 14.

Screw-bolts 15' pass through the members 13, through the ends of the members 11, across the elements 2 and through the circular ring 23 on the other side of the rim structure. Inasmuch as the ring 23 and the arcuate members 11 extend outwardly beyond the base of the tire 15, they serve to hold all of the members of my rim structure in their proper positions when the bolts 15' are in position with the nuts screwed thereon.

Figure 3:
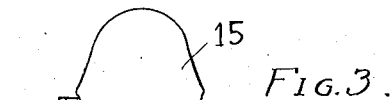
Fig. 3, is an enlarged sectional view of the device used to hold alternate pairs of the springs 3 and 5 in correct position and to adjust the tension of the inner spring.

In Figure 3 there is shown adjusting device for inner spring 3 which is used on alternate pairs of the springs 5 and 3 around the rim structure.

By the use of this structure on alternate members 7 it is possible to use only two arcuate members 11 since with the use of this adjusting device no plurality of guiding members is presented outwardly.

This adjusting device comprises a set screw 23' which is screw-threaded into the element 2 as on its upper end reduced cylindrical portion 26 which seats in correspondingly shaped socket 25 in a clip 24 which surrounds spring 3.

Having described my invention what I claim is:

1. In a resilient rim structure for vehicle wheels, a circular element adapted to fit about the periphery of a vehicle wheel, a tire spaced from said element outwardly, a plurality of leaf springs arranged about the periphery of said element and located between said tire and said element with their ends so arranged that each end of each spring slides on another spring for a considerable distance, certain of said springs being arranged in pairs with their ends curved oppositely, the ends of the inner spring of each pair curving outwardly and the outer spring having its ends curving inwardly, the ends of the inner springs contacting with the inner surfaces of the outer springs, so as to slide on said surfaces, radially arranged means passing through said element and screw threaded thereinto for adjusting said springs and presenting new surfaces of said tire for use, a flange secured to each side of said element, one of said flanges having a plurality of arcuate sections, and U-shaped guiding members secured at the midpoints of said springs and extending radially inwardly and closely adjacent to the sides of said element so as to allow said springs to move inwardly, and outwardly, radially.

2. In a resilient rim structure for vehicle wheels, a circular element adapted to fit about the periphery of a vehicle wheel, a tire spaced from said element outwardly, a plurality of leaf springs arranged about the periphery of said element and located between said tire and said element with their ends so arranged that each end of each spring slides on another spring for a considerable distance, certain of said springs being arranged in pairs with their ends curved oppositely, the ends of the inner spring of each pair curving outwardly and the outer spring having its ends curving inwardly, the ends of the inner springs contacting with the inner surfaces of the outer springs, so as to slide on said surfaces, radially arranged means passing through said element and screw threaded thereinto for adjusting said springs and presenting new surfaces of said tire for use, a flange secured to each side of said element, one of said flanges having a plurality of arcuate sections and U-shaped guiding members secured at the mid-points of said springs and extending radially inwardly and closely adjacent to the sides of said element so as to allow said springs to move inwardly and outwardly, radially, said arcuate members terminating closely adjacent to said guiding members so that the ends of the former shall lie parallel to each other and form a guide-way for said members.

3. In a resilient rim structure, an element adapted to fit about the periphery of a vehicle wheel, a tire spaced from said element outwardly, a plurality of leaf springs arranged about the periphery of said element, some of said springs being arranged in pairs, having oppositely curved ends, said ends of said springs being arranged to slide upon each other for a considerable distance, a radially arranged set-screw, screw-threaded into said element for each of said pairs of springs and adapted to adjust the tension of the inner one of each of said pairs of springs, a clip member surrounding the inner spring of alternate pairs of said pairs of springs, a socket in said clip member on the inner side of said spring, and a reduced cylindrical portion on the upper end of said set-screw fitting into said socket.

In testimony whereof I affix my signature.

FREDERICK THORNTON.